Oct. 8, 1946.　　　　　H. BANY　　　　　2,409,010
AUTOMATIC CONTROL EQUIPMENT
Filed March 27, 1943
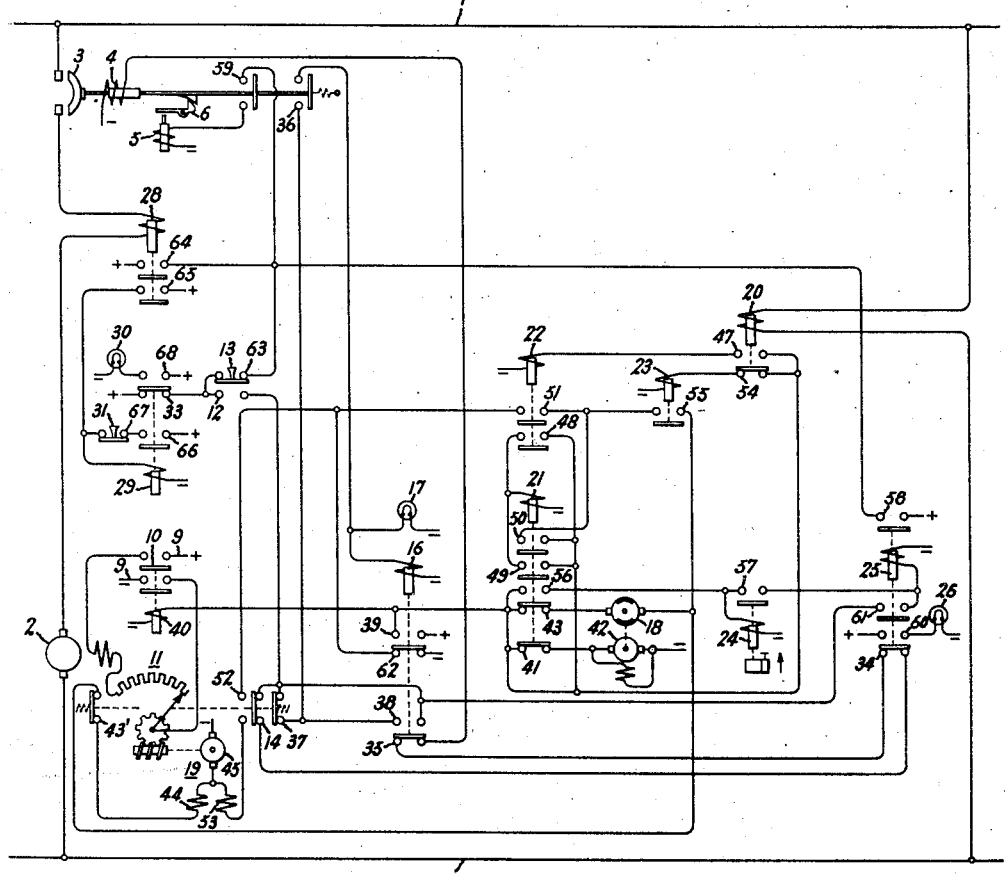
Inventor:
Herman Bany,
by Harry E. Dunham
His Attorney.

Patented Oct. 8, 1946

2,409,010

UNITED STATES PATENT OFFICE 2,409,010

AUTOMATIC CONTROL EQUIPMENT

Herman Bany, Lansdowne, Pa., assignor to General Electric Company, a corporation of New York Application March 27, 1943, Serial No. 480,776

10 Claims. (Cl. 171—119)

My invention relates to automatic control equipments and particularly to equipments for controlling the voltage of a load circuit in different predetermined manners during different portions of a predetermined time interval.

During certain processing cycles, such for example as the anodizing process in which the resistance of the load circuit increases with the length of time the circuit is energized, it is essential that the voltage supplied to the load circuit shall vary in a predetermined manner during a predetermined portion of the processing cycle and in a different manner during another portion of the cycle, and one object of my invention is to provide an improved arrangement of apparatus for accomplishing such a result.

In the particular embodiment of my invention shown in the drawing, I have illustrated an improved arrangement of apparatus for gradually increasing the voltage across a load circuit from a predetermined minimum to a predetermined maximum value at a predetermined rate and for maintaining the voltage at said maximum value for a predetermined time after the voltage reaches the predetermined maximum value.

My invention will be better understood from the following description when taken in connection with the accompanying drawing, the single figure of which diagrammatically illustrates a direct current generator voltage control equipment embodying my invention, and its scope will be pointed out in the appended claims.

Referring to the accompanying drawing, I represents a direct current load circuit which is arranged to be supplied with current from a direct current generator 2. A circuit breaker 3 is provided for connecting the generator 2 across the load circuit I. As shown in the drawing, the circuit breaker 3 is of the latched closed type having a closing coil 4 which, when energized, closes the circuit breaker and a trip coil 5 which, when energized, releases a holding latch 6 to effect the opening of the circuit breaker. The generator 2 is provided with a field winding 8 which is arranged to be connected to a suitable source of excitation 9 by means of a field switch 10. A motor operated rheostat 11 is provided in series with the field winding 8 so that the voltage of the generator 2 may be varied over a predetermined range by adjusting the rheostat 11. The circuit breaker 3 is arranged to be closed in response to the closing of the contacts 12 of a suitable control device 13, shown as a manually controlled switch, if at the time the contacts 12 are closed the motor operated rheostat 11 is in its position corresponding to the minimum voltage of the generator 2 so that the rheostat contacts 14 are closed. As soon as the circuit breaker 3 closes, a circuit is completed for a master relay 16 and a signal lamp 17, which, when lighted, indicates that the processing cycle is in operation. The energization of the master relay 16 effects the closing of the field switch 10 and initiates the operation of suitable control devices to cause the rheostat 11 to be adjusted gradually in such a manner as to increase the generator voltage at a predetermined rate from its minimum value to a predetermined maximum value. This result is accomplished by periodically completing, by means of a suitable interrupter 18, an energizing circuit for the driving motor 19 of the rheostat 11 so that the motor 19 is intermittently rotated a predetermined amount in a direction to effect an increase in the voltage of generator 2. When the generator voltage has been increased to the desired maximum value, a voltage relay 20 which is connected across the load circuit I operates and effects the operation of a control relay 21 which in turn removes the control of the rheostat 11 from the interrupter 18 and places it under the control of the voltage relay 20 so that thereafter the rheostat 11 is adjusted in such a manner as to maintain the voltage of the generator 2 at the desired maximum value. When the load circuit voltage is above the desired maximum value after the relay 21 has been picked up, the relay 20 completes an energizing circuit for a control relay 22 which in turn completes an energizing circuit for the motor 19 so as to cause it to rotate in a direction to decrease the generator voltage, whereas when the load circuit voltage decreases below the desired maximum value, the voltage relay 20 completes an energizing circuit for a control relay 23 which in turn completes an energizing circuit for the motor 19 so as to cause it to rotate in a direction to increase the voltage of the generator 2. After the voltage of the generator 2 has been maintained at the desired maximum value for a predetermined time, a time relay 24, which is set into operation by the control relay 21 picking up, completes its timing operation and closes a circuit for a control relay 25 which in turn effects the lighting of a signal lamp 26 to notify the attendant that the processing cycle has been completed. Also, the control relay 25 is arranged to effect the opening of the circuit breaker 3 and to prevent its reclosure until after the control switch 13 has been manually operated so as to open its contacts 12.

In order to protect the generator 2 against overload, a suitable overcurrent relay 28 is connected in series with the generator 2 and is arranged to effect the opening of the circuit breaker 3 and the energization of a control relay 29 in response to the generator current exceeding a predetermined value. The control relay 29, when in its operated position, effects the lighting of an indicating lamp 30 and the completion of a locking circuit for the relay 29 which can be interrupted only by the operation of an associated manually controlled switch 31. Also, when it is in its operated position, the control relay 29 is arranged to prevent the control switch 13 from completing the energizing circuit for the closing coil 4 of the circuit breaker 3.

The operation of the control arrangement shown in the drawing is as follows. The various control devices are shown in the positions which they occupy when the generator 2 is not in operation. When it is desired to start the processing cycle, the generator 2 is brought up to its operating speed in any suitable manner, not shown in the drawing, and then the control switch 13 is operated so that its contacts 12 are closed to complete an energizing circuit for the closing coil 4 of the circuit breaker 3 through the contacts 33 of the relay 29, the contacts 14 of the rheostat 11 which are closed when the rheostat is in its minimum voltage position, the contacts 34 of the relay 25, and the contacts 35 of the relay 16. The closing of the main contacts of the circuit breaker 3 connects the unexcited generator 2 across the load circuit 1, and the closing of the auxiliary contacts 36 of the circuit breaker 3 completes circuits for the master relay 16 and the signal lamp 17 through the contacts 33 of the relay 29, the contacts 12 of the control switch 13, and the contacts 37 of the rheostat 11. By closing its contacts 38, the relay 16 completes a shunt circuit around the contacts 37 so that the relay 16 remains energized and the lamp 17 remains lighted when the rheostat 11 is subsequently moved out of its minimum voltage position. By closing its contacts 39, the relay 16 completes an energizing circuit for the closing coil 40 of the field switch 10 so that the generator field winding 8 and the adjustable rheostat 11 are connected in series across the source of excitation 9. The closing of the contacts 39 of the relay 16 also completes through the contacts 41 of the relay 21 an operating circuit for the motor 42 which drives the interrupter 18 and also completes an operating circuit for the motor 19 of the rheostat 11 which is periodically completed through the contacts 43 of the relay 21, the interrupter 18, the auxiliary contacts 43' of the rheostat 11, the field winding 44, and the armature winding 45 of the motor 19. This operating circuit for the motor 19 causes the rheostat 11 to be operated periodically in such a manner as to increase the generator voltage at a predetermined rate until the generator voltage reaches a predetermined value when the voltage relay 20 picks up and closes its contacts 47 thereby completing an energizing circuit for the control relay 22 through the contacts 39 of the relay 16. By closing its contacts 48, the relay 22 completes an energizing circuit for the control relay 21 through the contacts 39 of the relay 16. By opening its contacts 41 and 43, the control relay 21 renders the interrupter 18 inoperative to control the operation of the rheostat 11, and by closing its contacts 49, the relay 21 completes a locking circuit for itself so that it does not become deenergized in response to a subsequent opening of the contacts 48 of the control relay 22.

The closing of the contacts 50 of the relay 21 completes a circuit for the rheostat motor 19 through the contacts 39 of the relay 16, the contacts 51 of the relay 22, the contacts 52 of the rheostat 11, the field winding 53, and the armature winding 45 of the motor 19 so that the rheostat motor is rotated in a direction to decrease the generator voltage. When the voltage of the load circuit 1 decreases so that the contacts 54 of the voltage relay 20 are closed, an energizing circuit is completed for the control relay 23 through the contacts 39 of the relay 16. The closing of the contacts 55 of the control relay 23 completes through the contacts 50 of relay 21 a shunt circuit around the contacts 43 of the relay 21 and the interrupter 18 so that the rheostat motor 19 is operated continuously in a direction to increase the voltage of the generator 2. Therefore, while the control relay 21 remains in its energized position, the rheostat 11 is controlled so as to maintain the generator voltage at the desired maximum value.

The closing of the contacts 56 of control relay 21 completes an energizing circuit for the time relay 24 through the contacts 39 of the relay 16 so that after the desired maximum voltage has been maintained for a predetermined time, the time relay 24 closes its contacts 57 and completes an energizing circuit for the control relay 25 through the contacts 56 of the relay 21 and the contacts 39 of the relay 16. The closing of the contacts 58 of the relay 25 completes an energizing circuit for the trip coil 5 of the circuit breaker 3 through the auxiliary contacts 59 of the circuit breaker so that the circuit breaker 3 opens to terminate the processing cycle. The closing of the contacts 60 of the control relay 25 completes a circuit for the indicating lamp 26, the lighting of which informs the operator that the processing cycle has been completed. The closing of the contacts 61 of the relay 25 completes a locking circuit for the relay 25 through the contacts 12 of the control switch 13 and the contacts 33 of the relay 29. Therefore, the control relay 25 remains energized and the indicating lamp 26 remains lighted until the operator manually operates the control switch 13 so as to open its contacts 12.

The opening of the auxiliary contacts 36 of the circuit breaker 3 interrupts the heretofore described energizing circuit of the master relay 16 which in turn, by opening its contacts 39, interrupts the energizing circuits of the relays 21 to 24, inclusive, so that all of these relays are deenergized. The closing of the contacts 62 of the master relay 16 completes an energizing circuit for the rheostat motor 19 through the contacts 52 of the rheostat 11, the field winding 53, and the armature winding 45 of the motor 19 so that the motor operates continuously in a direction to restore the rheostat 11 to its minimum voltage position, in which position the contacts 52 are open and the contacts 14 and 37 are closed. The closing of the contacts 14 of the rheostat 11, before the control switch 13 is operated by the operator to open the contacts 12, does not reestablish an energizing circuit for the closing coil 4 of the circuit breaker 3 because this circuit is open at the contacts 34 of the energized control relay 25 until the contacts 12 are opened. Before the operator can initiate another processing cycle, it is evident that he must first move the control switch 13 so as to open the contacts 12 and thereby effect the deenergization of the control relay 25.

The operator can stop the processing cycle at any time merely by operating the control switch 13 so as to open its contacts 12 and close its contacts 63 thereby completing an energizing circuit for the trip coil 5 through the contacts 33 of the relay 29 and the auxiliary contacts 59 of the circuit breaker 3. The opening of the circuit breaker 3 then effects the deenergization of the master relay 16 and of the control relays 21 to 24, inclusive, and the restoration of the rheostat 11 to its minimum voltage position in the manner heretofore described.

In case the generator 2 becomes overloaded while it is supplying current to the load circuit 1, the overcurrent relay 28 closes its contacts 64 and completes an energizing circuit for the trip coil 5 to effect the opening of the circuit breaker 3. The opening of the circuit breaker 3 then effects the deenergization of the relays 16 and 20 to 24, inclusive, and the restoration of the rheostat 11 to its minimum voltage position in the manner heretofore described. The closing of the contacts 65 of the overcurrent relay 28 completes an energizing circuit for the control relay 29 which, by closing its contacts 66, completes a locking circuit for itself through the contacts 67 of the manually controlled switch 31. The closing of the contacts 68 of the relay 29 completes a circuit for the indicating lamp 30, the lighting of which informs the operator that the circuit breaker 3 has been opened and the processing cycle has been terminated by an overload on the generator 2. The opening of the contacts 33 of the relay 29 prevents the circuit of the closing coil 4 from being re-established until after the operator has operated the control switch 31 in such a manner as to open the contacts 67.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a source of current having a field winding, an adjustable field rheostat controlling the excitation of said field winding to control the voltage of said source, a control device, means responsive to said control device being in a predetermined position while said rheostat is in a position to effect a predetermined minimum source voltage for effecting the operation of said rheostat so as to effect an increase in said source voltage at a predetermined rate, means responsive to said source voltage being raised to a predetermined value by said first mentioned means for thereafter controlling said rheostat to maintain said source voltage at said predetermined value, timing means responsive to said source voltage reaching said predetermined value, and signalling means controlled by said timing means after it has been in operation for a predetermined time.

2. In combination, a source of current having a field winding, an adjustable field rheostat controlling the excitation of said field winding to control the voltage of said source, a control device, means responsive to said control device being in a predetermined position while said rheostat is in a position to effect a predetermined minimum source voltage for effecting the intermittent operation of said rheostat to gradually increase said source voltage so that it reaches a predetermined value at the expiration of a predetermined interval after the operation of said device, means responsive to said source voltage reaching said predetermined value for thereafter controlling said rheostat to maintain said source voltage at said predetermined value, signalling means, and timing means responsive to said source voltage reaching said predetermined value for effecting the operation of said signalling means after said source voltage has been maintained at said predetermined value for a predetermined time.

3. In combination, a source of current having a field winding, an adjustable field rheostat controlling the excitation of said field winding to control the voltage of said source, a control device, means responsive to said control device being in a predetermined position while said rheostat is in a position to effect a predetermined minimum source voltage for effecting the intermittent operation of said rheostat to gradually increase said source voltage so that it reaches a predetermined value at the expiration of a predetermined interval after the operation of said device, means responsive to said source voltage reaching said predetermined value for rendering inoperative said intermittent varying means for said rheostat and thereafter controlling said rheostat to maintain said source voltage at said predetermined value, signalling means, and timing means responsive to said source voltage reaching said predetermined value for effecting the operation of said signalling means after said source voltage has been maintained at said predetermined value for a predetermined time.

4. In combination, a source of current having a field winding, an adjustable field rheostat for controlling the excitation of said field winding to control the voltage of said source over a predetermined range, a control device, means responsive to said control device being in a predetermined position while said rheostat is in its position corresponding to the minimum voltage in said range for effecting the operation of said rheostat to effect an increase in said source voltage over said range at a predetermined rate, and means responsive to said source voltage being raised to the maximum voltage in said range for rendering said first mentioned means inoperative and for thereafter controlling said rheostat to maintain said source voltage at said maximum voltage.

5. In combination, a source of current having a field winding, a load circuit, switching means for connecting said source to said circuit, an adjustable field rheostat for controlling the excitation of said field winding to control the voltage of said source over a predetermined range, means controlled by said rheostat for permitting said switching means to connect said source to said circuit only when said rheostat is in its position corresponding to the minimum voltage in said range, a control device, means jointly controlled by said device and said switching means and said rheostat for effecting the operation of said rheostat to effect an increase in said source voltage over said range at a predetermined rate in response to said control device being in a predetermined position while said switching means is connecting said source to said circuit and said rheostat is in its position corresponding to the minimum voltage in said range, and means responsive to said source voltage being raised to the maximum voltage in said range for removing the control of said rheostat from said jointly controlled means and for thereafter controlling said rheostat to maintain said source voltage at said maximum voltage.

6. In combination, a source of current having a field winding, a load circuit, switching means for connecting said source to said circuit, an adjustable field rheostat for controlling the excitation of said field winding to control the voltage of said source over a predetermined range, means controlled by said rheostat for permitting said switching means to connect said source to said circuit only when said rheostat is in its position corresponding to the minimum voltage in said range, a control device, means jointly controlled by said device and said switching means and said rheostat for effecting the operation of said rheostat to effect an increase in said source voltage over said range at a predetermined rate in response to said control device being in a predetermined position while said switching means is connecting said source to said circuit and said rheostat is in its position correspondng to the minimum voltage in said range, means responsive to said source voltage being raised to the maximum voltage in said range for removing the control of said rheostat from said jointly controlled means and for thereafter controlling said rheostat to maintain said source voltage at said maximum voltage, means for effecting the operation of said switching means to disconnect said source from said circuit, and means controlled by said switching means when it is in a position to disconnect said source from said circuit for effecting the operation of said rheostat to its position corresponding to the minimum voltage in said range.

7. In combination, a source of current having a field winding, means for controlling the excitation of said field winding to adjust the voltage of said source, means for causing said voltage adjusting means to gradually raise said voltage up to a predetermined value, relay means responsive to the voltage value of the source to stop the raising of the voltage and thereupon to regulate the voltage within predetermined limits.

8. In combination, a source of current having a field winding, means for controlling the excitation of said field winding to adjust the voltage of said source, means for causing said voltage adjusting means to gradually raise said voltage up to a predetermined value within a predetermined time, relay means responsive to the voltage value of the source to stop the raising of the voltage and thereupon to regulate the voltage within predetermined limits.

9. In combination, a source of current having a field winding, a load circuit, means for connecting the source to the load, means for controlling the excitation of said field winding to adjust the voltage of said source, means for causing said voltage adjusting means to gradually raise said voltage up to a predetermined value, relay means responsive to this voltage drop to stop the raising of the voltage and to thereupon regulate the voltage within predetermined limits, and time delay responsive means to disconnect the source from the load circuit after a predetermined time.

10. In combination, a source of current having a field winding, a load circuit of varying resistance dependent upon the length of time it has been energized, means for connecting the source to the load, means for controlling the excitation of said field winding to adjust the source voltage in a manner to hold the current below a predetermined value, relay means responsive to a predetermined value of the source voltage to stop the raising of the source voltage and to maintain such voltage thereafter within predetermined limits.

HERMAN BANY.

Certificate of Correction

Patent No. 2,409,010.  October 8, 1946.

HERMAN BANY

It is hereby certified that error appears in the printed specification of the above numbered patent requiring correction as follows: Column 8, line 24, claim 9, for the word "drop" read *value*; and that the said Letters Patent should be read with this correction therein that the same may conform to the record of the case in the Patent Office.

Signed and sealed this 8th day of April, A. D. 1947.

[SEAL]

LESLIE FRAZER,
*First Assistant Commissioner of Patents.*